(12) United States Patent
Sasaki et al.

(10) Patent No.: US 7,617,395 B2
(45) Date of Patent: Nov. 10, 2009

(54) BATTERY AND AUTHENTICATION REQUESTING DEVICE

(75) Inventors: Dai Sasaki, Tokyo (JP); Shiho Moriai, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 801 days.

(21) Appl. No.: 11/283,675

(22) Filed: Nov. 21, 2005

(65) Prior Publication Data

US 2006/0117176 A1    Jun. 1, 2006

(30) Foreign Application Priority Data

| Nov. 26, 2004 | (JP) | ............................. 2004-342945 |
| Nov. 26, 2004 | (JP) | ............................. 2004-342946 |
| Sep. 9, 2005 | (JP) | ............................. 2005-263010 |

(51) Int. Cl.
*H04L 9/00* (2006.01)

(52) U.S. Cl. ...................................................... 713/168

(58) Field of Classification Search ................. 713/155, 713/168

See application file for complete search history.

(56) References Cited

U.S. PATENT DOCUMENTS

| 5,473,689 | A | 12/1995 | Eberhard |
| 6,058,476 | A | 5/2000 | Matsuzaki |
| 6,480,869 | B1 | 11/2002 | Fujioka |
| 6,711,400 | B1 * | 3/2004 | Aura ........................ 455/411 |
| 6,769,060 | B1 | 7/2004 | Dent |
| 6,771,042 | B2 | 8/2004 | Chen |
| 6,795,913 | B1 | 9/2004 | Ricordel et al. |
| 2002/0025046 | A1 | 2/2002 | Lin |
| 2003/0101378 | A1 | 5/2003 | Ohkubo |
| 2003/0117112 | A1 | 6/2003 | Chen |
| 2004/0204182 | A1 | 10/2004 | Angelo |
| 2005/0001589 | A1 | 1/2005 | Edington et al. |
| 2005/0010782 | A1 | 1/2005 | Ohkubo |
| 2005/0108309 | A1 | 5/2005 | Tsuboka et al. |

FOREIGN PATENT DOCUMENTS

DE            43 17 380 C1        8/1994

(Continued)

OTHER PUBLICATIONS

International Seach Report and Written Opinion for corresponding French Application No. 0553555 dated Mar. 12, 2008.

(Continued)

*Primary Examiner*—Jung Kim
*Assistant Examiner*—Samson B Lemma
(74) *Attorney, Agent, or Firm*—Matthew B. Dernier, Esq.; Gibson & Dernier LLP

(57) ABSTRACT

A peripheral device that is connected to a main body as an authentication requesting device operates as a device to be authenticated. Receiving code-related information from the main body, the peripheral device acquires a challenge code on the basis of the received code-related information, generates encrypted information by encrypting the challenge code, and transmits encryption-related information that relates to the generated encrypted information to the main body. The code-related information is part of the challenge code and/or the encryption-related information is part of the encrypted information.

8 Claims, 5 Drawing Sheets

FOREIGN PATENT DOCUMENTS

| | | | |
|---|---|---|---|
| EP | 0809379 | A2 | 11/1997 |
| EP | 0 984 542 | A2 | 3/2000 |
| EP | 0925665 | | 2/2002 |
| GB | 2379547 | B | 3/2003 |
| JP | 08-130536 | A | 5/1996 |
| JP | 11-163853 | A | 6/1999 |
| JP | 2000-517487 | A | 12/2000 |
| JP | 2001-500685 | A | 1/2001 |
| JP | 2003-162986 | A | 6/2003 |
| JP | 2005-110347 | A | 2/2005 |
| TW | 471194 | | 1/2002 |
| TW | 530429 | | 5/2003 |
| TW | 543262 | | 7/2003 |
| WO | WO 97/23986 | A1 | 7/1997 |
| WO | 9811553 | A1 | 3/1998 |
| WO | 9958987 | A1 | 11/1999 |

OTHER PUBLICATIONS

Spanish Office Action for corresponding patent application No. 200502919 dated: May 30, 2008.
Taiwan Search Report for corresponding TW patent application No. 094140276 dated: Feb. 19, 2009.
Office Action and Information Disclosure Statement for Geramn Application No. 10 2005 054 646.6-31, dated Feb. 24, 2006.
Beutelspacher, Albrecht; Kryptologie, pp. 90-93.
GB Combined Search And Examination Report, Dec. 16, 2005.
Menezes et al.; Handbook of Applied Cryptography; 1997; CRC Press; pp. 397-403.
Partial English Translation of Office Action for Japanese Appln. No. 2005-263010, dated Oct. 18, 2005; pp. 1-6.

* cited by examiner

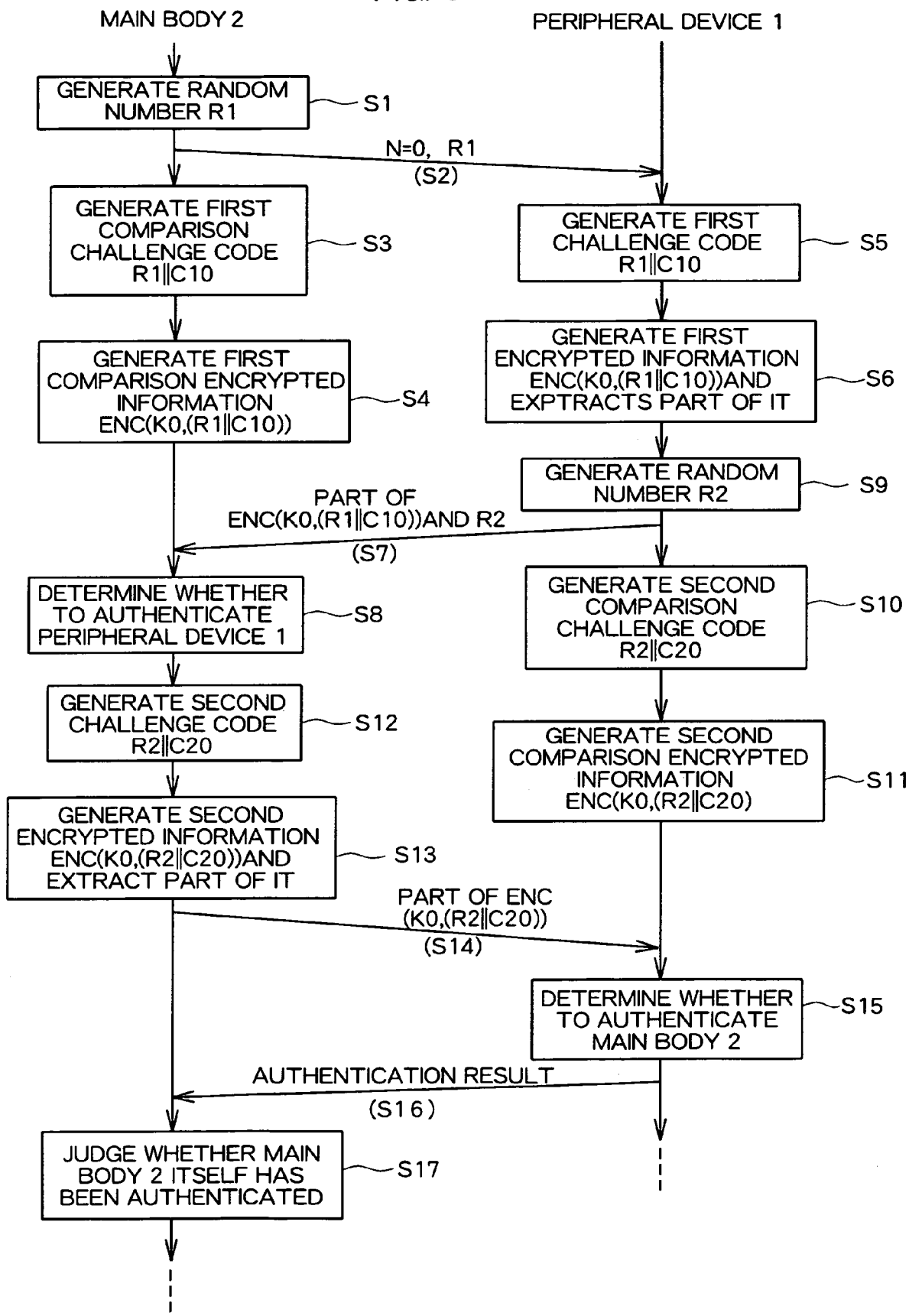

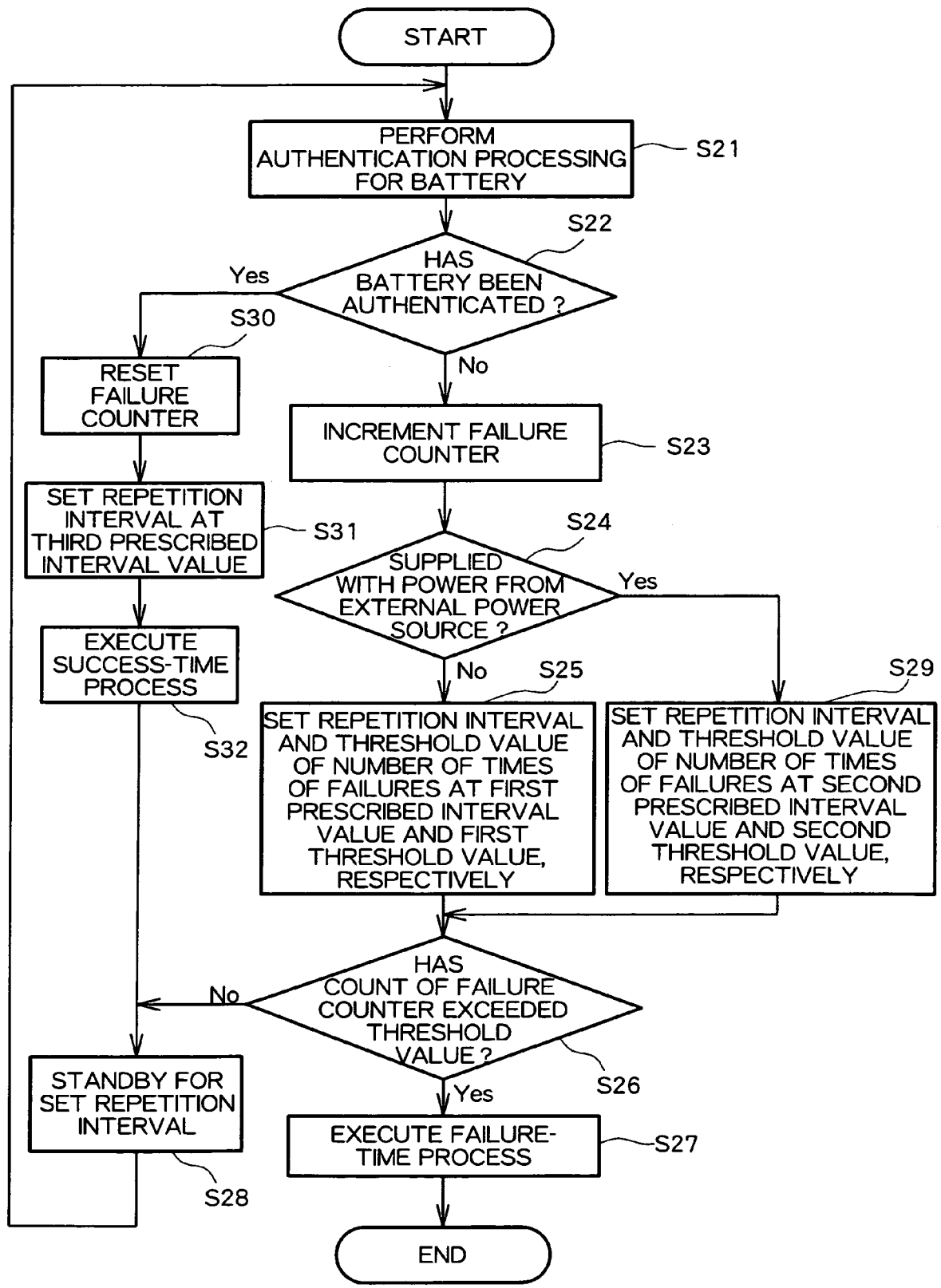

BATTERY AND AUTHENTICATION REQUESTING DEVICE

CROSS-REFERENCE TO RELATED APPLICATIONS

The priority application Numbers JP 2004-342945, JP 2004-342946 and JP 2005-263010 upon which this patent application is based are hereby incorporated by reference.

BACKGROUND OF THE INVENTION

The present invention relates to a battery as a subject of authentication and an authentication requesting device that is connected to the battery and issues a battery authentication request.

In recent years, various consumer electronics appliances including home game machines have increased in functionality and types whose functions can be extended by connecting peripheral devices to the appliance main body have increased. In such appliances, to avoid such trouble as results from a user erroneously connecting a product of another company to the appliance main body, there may occur a case that it is desired to judge whether a peripheral device is authentic (genuine).

One method for this purpose is to subject the appliance main body and the peripheral device to authentication processing generally used in computer systems to a check as to whether a peripheral device is authentic. For example, a general example of challenge-response-type authentication is disclosed in JP-A-11-163853.

Incidentally, in recent years, even for batteries, makers that provide fake (counterfeit) products have appeared, which increasingly cause problems such as unstable supply of power because of differences in electrical ratings. Therefore, even for batteries, it is now increasingly necessary to perform authentication processing to check whether a product is authentic. For this purpose, a battery authentication method disclosed in JP-T-2000-517487 (the symbol "JP-T" as used herein means a published Japanese translation of a PCT patent application) may be employed.

However, in contrast to information apparatus, appliances used in homes such as consumer electronics appliances may have the drawback of generating a large amount of electric noise during operation. One way to counteract this is to perform authentication processing repeatedly to increase the reliability of the authentication.

However, where authentication processing is performed repeatedly, the amount of data that are exchanged between a peripheral device and the main body becomes large and the communication load increases accordingly. In consumer electronics appliances and the like, processing that relates to the functions of the appliance itself takes priority. Therefore, it is not desirable to increase the load of communications that are performed between the main body and a peripheral device and do not relate to the functions of the appliance itself.

Further, in the above conventional authentication method, consideration is not given to problems specific to a device to be authenticated such as a problem that a battery is not charged up.

SUMMARY OF THE INVENTION

The present invention has been made in view of the above circumstances in the art, and an object of the invention is therefore to provide a battery capable of reducing the amount of data that are exchanged for authentication and thereby lowering the communication load.

Another object of the invention is to provide a battery in which consideration is given to problems specific to the battery itself as a device to be authenticated.

To solve the above problems in the art, the invention provides an authentication system comprising a battery and an authentication requesting device which authenticates the battery, the battery and the authentication requesting device holding a common encryption key, wherein the authentication requesting device generates first code-related information and transmits it to the battery, acquires a first comparison challenge code on the basis of the first code-related information, and generates first comparison encrypted information by encrypting the first comparison challenge code using the encryption key; the battery receives the first code-related information, acquires a first challenge code on the basis of the received first code-related information, generates first encrypted information by encrypting the acquired first challenge code using the encryption key, and transmits first encryption-related information relating to the first generated encrypted information to the authentication requesting device; the authentication requesting device determines whether to authenticate the battery by comparing the received first encryption-related information with comparison first encryption-related information relating to the generated first comparison encrypted information; and the first code-related information is part of the first challenge code and/or the first encryption-related information is part of the first encrypted information.

BRIEF DESCRIPTION OF THE DRAWINGS

FIG. 6 is a flowchart showing a flow of communications between the peripheral device 1 and the main body 2; and FIG. 7 is a flowchart showing an exemplary process executed by the main body 2.

DESCRIPTION OF THE PREFERRED EMBODIMENT

Figure 1:
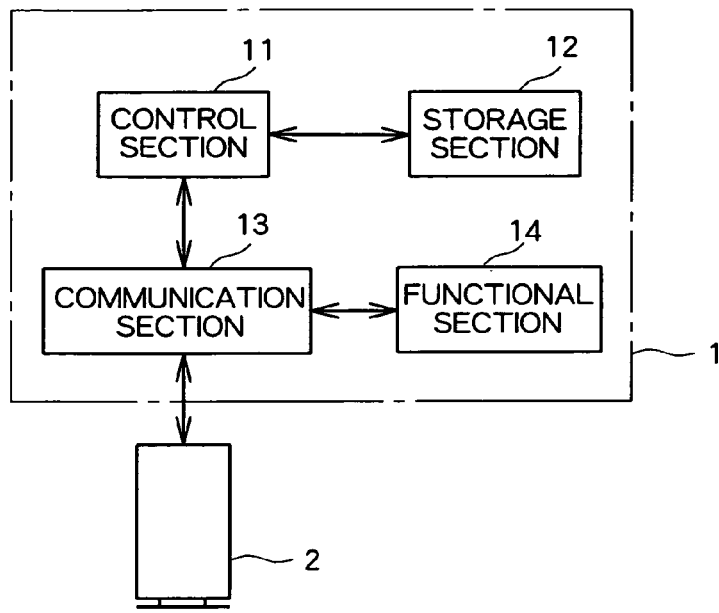
FIG. 1 is a block diagram outlining the configuration of a peripheral device 1.

An embodiment of the present invention will be hereinafter described with reference to the accompanying drawings. A battery according to the embodiment is implemented as a peripheral device 1. As shown in FIG. 1, the peripheral device 1 includes a control section 11, a storage section 12, a communication section 13, and a functional section 14, and is connected to a main body 2.

The control section 11 is a CPU or the like and operates according to programs stored in the storage section 12. The control section 11 performs processing for realizing the functions of the peripheral device 1. For a manipulation device such as a controller as a peripheral device 1, the control section 11 performs processing of transmitting information relating to an instruction manipulation of a user to the main body 2. For a storage device such as a memory card as a peripheral device 1, the control section 11 performs processing of holding information received from the main body 2 and processing of supplying information held therein to the main body 2 in response to a request from the main body 2. Although in this embodiment the device to be authenticated is the power supply (i.e., battery), the peripheral device 1 as the device to be authenticated may also be any of other various devices including a communication device, an imaging device such as a camera, and a sound device such as a speaker.

To realize an authentication function, the control section 11 also performs processing of receiving first code-related information, acquiring a first challenge code based on the received first code-related information, and generating first encrypted information by encrypting the first challenge code. The processing for realizing the authentication function of the controller 11 will be described later in detail.

The storage section 12 includes a storage element such as a flash ROM and a RAM, and stores programs to be run by the control section 11. The storage section 12 also operates as a work memory for storing various data that are necessary during processing of the control section 11.

The communication section 13 is a serial communication port, for example, and is connected to the main body 2. The communication section 13 transmits information to the main body 2 according to an instruction that is input from the control section 11. Further, the communication section 13 outputs, to the control section 11, information received from the main body 2.

The functional section 14 provides the functions of the peripheral device 1. Since in this embodiment the peripheral device 1 is the battery, the functional section 14 includes a secondary battery for supplying electric power.

Figure 2:
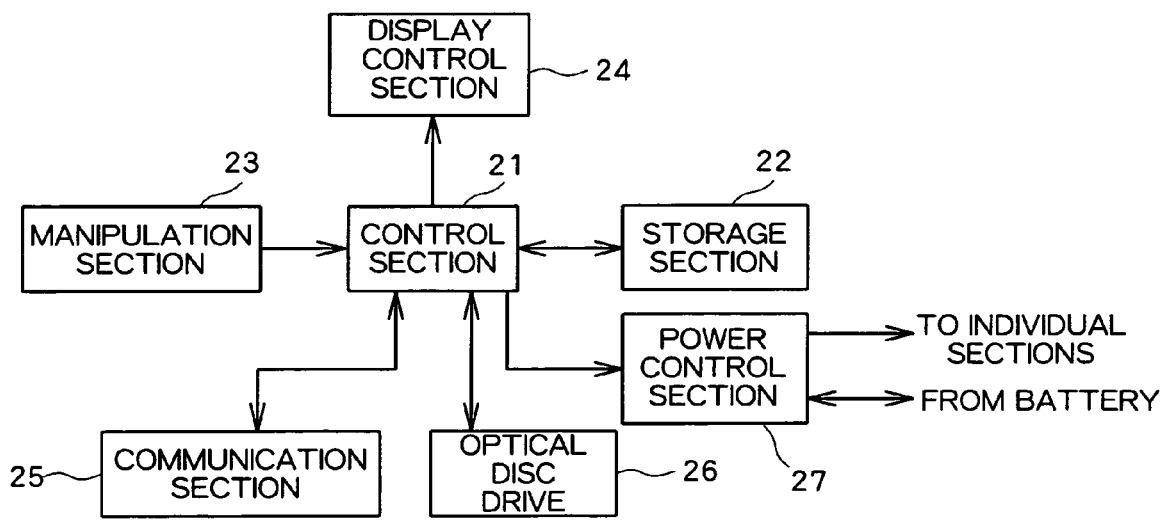
FIG. 2 is block diagram outlining the configuration of a main body 2.

As shown in FIG. 2, the main body 2, which is a home game machine, for example, includes a control section 21 such as a CPU, a storage section 22, a manipulation section 23, a display control section 24, a communication section 25, an optical disc drive 26, and a power control section 27.

The control section 21 operates according to programs stored in the storage section 22. For example, the control section 21 performs processing that relates to a game. In this embodiment, the control section 21 also performs operations of an authentication requesting device. The detailed processing that is performed by the authentication requesting device aspect of the control section 21 will be described later.

The storage section 22, which includes a RAM, for example, holds game programs that are read by the optical disc drive 26. The storage section 22 also includes a nonvolatile storage element, where programs for the authentication requesting device are stored. The storage section 22 also operates as a work memory for the control section 21.

The manipulation section 23, which is a game controller, outputs the content of an instruction manipulation of a player to the control section 21. The display control section 24, which is a graphic circuit, displays a game picture on a display device such as a home TV receiver according to an instruction inputted from the control section 21. The communication section 25, which is a serial communication port, for example, is connected to the communication section 13 of the peripheral device 1 and exchange information with it. In this embodiment, the communication section 25 transmits information to the peripheral device 1 according to an instruction inputted from the control section 21, and outputs, to the control section 21, information received from the peripheral device 1.

The optical disc drive 26, which is a DVD-ROM drive or a Blu-ray disc drive, for example, reads information such as programs from a recording medium such as a DVD, a Blu-ray disc, or the like and outputs it to the control section 21.

Figure 3:
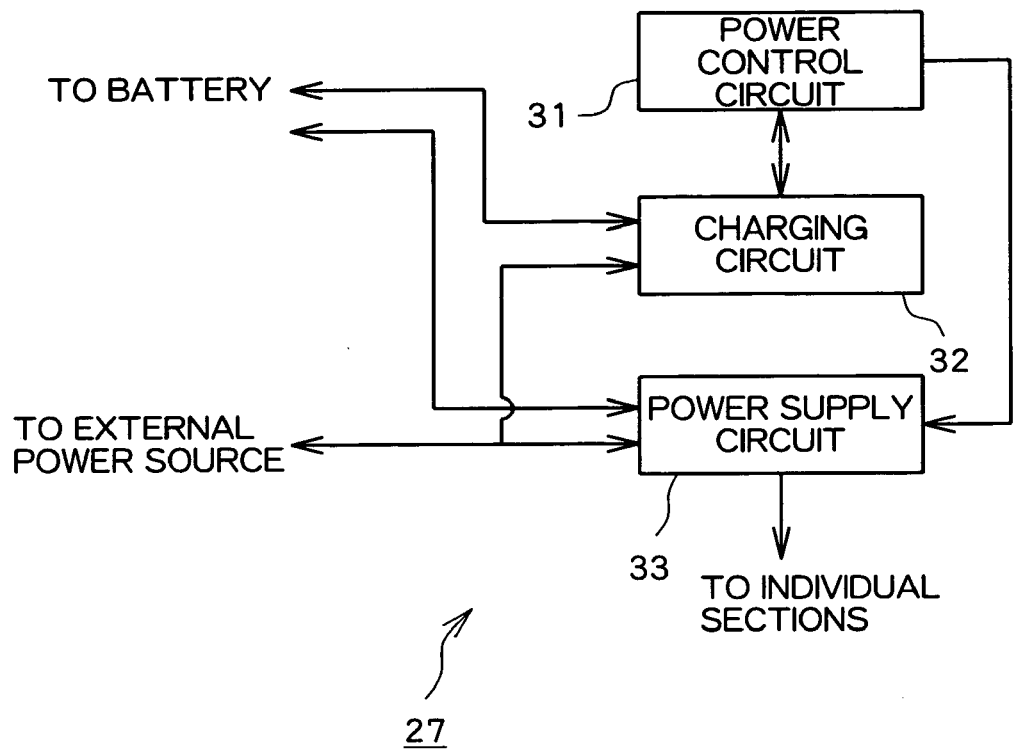
FIG. 3 is block diagram showing the configuration example of a power control section of the main body 2.

As shown in FIG. 3, the power control section 27, which is connected to the battery as the peripheral device 1, includes a power control circuit 31, a charging circuit 32, and a power supply circuit 33. The power control circuit 31 controls the supply of power from the battery or the power supply circuit 33 to the individual sections such as the control section 21. For example, if a player turns on the power, the power control circuit 31 starts to supply power to the individual sections. If a player turns off the power or an instruction to turn off the power (power shutoff instruction) comes from the control section 21, the power control circuit 31 stops supply of power to the individual sections.

The charging circuit 32 charges the battery if the battery is connected to it in a state that it is supplied with power from the power supply circuit 33. The power supply circuit 33 is a regulator, for example, and is connected to an external power source (e.g., home wall socket). The power supply circuit 33 is supplied with a DC power supply voltage that is generated on the basis of the power from the external power source, and outputs it to the power control circuit 31 and the charging circuit 32. The power supply circuit 33 corresponds to a "power receiving section" of the invention.

The power control section 27 supplies the individual sections with power that is supplied from the battery if the battery is connected to it in a state that the power supply circuit 33 is not supplied with power from any external power source. If the power supply circuit 33 is supplied with power from an external power source, the power control section 27 supplies the individual sections with power that is supplied from the external power source. Further, the power control section 27 charges the battery if the battery is connected to it in a state that the power supply circuit 33 is supplied with power from an external power source.

A description will now be made of the processing for realizing the authentication function which is performed by the control section 11 of the peripheral device 1. In this embodiment, plural encryption key candidates k0, k1, . . . are stored in advance in the storage section 12 of the peripheral device 1.

Figure 4:
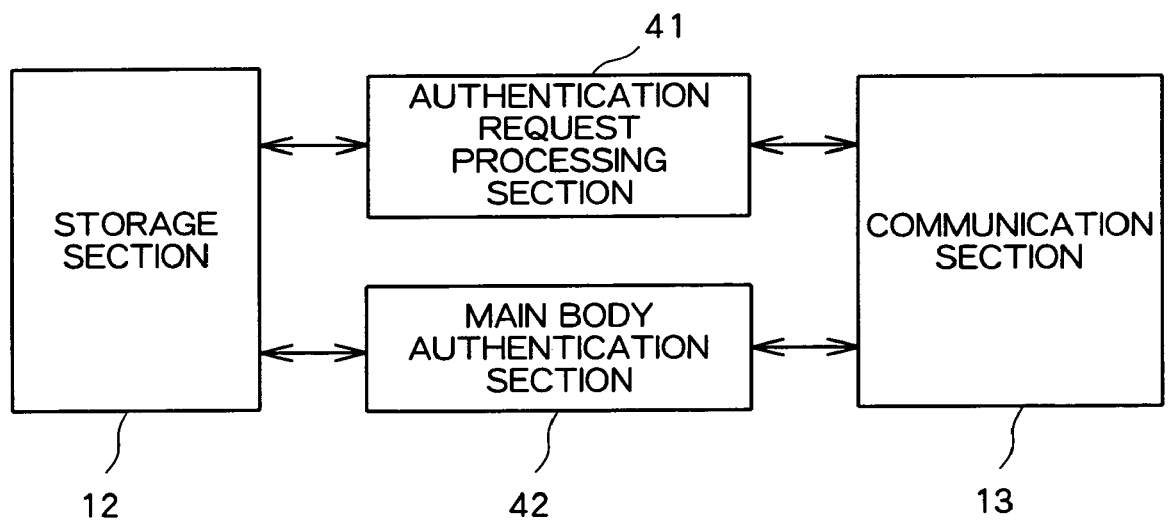
FIG. 4 is a functional block diagram of an example of the peripheral device 1.

Expressed in functional terms, as shown in FIG. 4, the control section 11 includes an authentication request processing section 41 and a main body authentication section 42.

The authentication request processing section 41 receives, from the main body 2 (authentication requesting device), via the communication section 13, first code-related information from which a first challenge code is to be generated. Further, the authentication request processing section 41 receives, from the main body 2, encryption key identifying information to be used for identifying one encryption key, and reads, from the storage section 12, an encryption key kN that is identified by the encryption key identifying information (e.g., a key number N).

It is assumed here that the first code-related information is part of a first challenge code. For example, where a 128-bit first challenge code is used, the main body 2 sends, as the first code-related information, 64-bit information that is to correspond to the first half (upper half) of 128-bit information. The authentication request processing section 41 generates a first challenge code on the basis of the first code-related information and acquires it.

In this embodiment, a plurality of first constants C10, C11, . . . are stored in the storage section 12 in advance. A first challenge code is generated by reading, from the storage section 12, a first constant C1N corresponding to a key number N that is received as encryption key identifying information and placing the read-out first constant C1N after the received first code-related information. Where as described above the first code-related information is of 64 bits for the 128-bit first challenge code, each of the first constants C10, C11, . . . is a 64-bit constant. The first constant is "common-part information" of the invention.

The authentication request processing section 41 generates first encrypted information by encrypting the first challenge code that has been generated by using the encryption key kN read from the storage section 12.

Further, the authentication request processing section 41 extracts, as first encryption-related information, a predetermined part (e.g., second half (lower half)) of the first encrypted information, and transmits the extracted first encryption-related information to the main body 2. For example, if the first challenge code is of 128 bits and the algorithm of the above encryption is of a coding method that does not change the code length of encryption subject information, the first encrypted information also has 128 bits. The authentication request processing section 41 transmits the predetermined part (e.g., second-half 64 bits) of the 128-bit first encrypted information to the main body 2.

To authenticate the main body 2 (authentication requesting device), the main body authentication section 42 generates second code-related information that relates to a second comparison challenge code (second challenge code for comparison) to be used for authenticating the main body 2. For example, the main body authentication section 42 generates a numerical value having a prescribed number of bits by a random number routine and transmits the generated random number as second code-related information to the main body 2 via the communication section 13.

Further, the main body authentication section 42 generates a second comparison challenge code on the basis of the generated second code-related information. In this embodiment, plural second constants C20, C21, . . . are stored in the storage section 12 in advance. A second constant C2N corresponding to the key number N that was received previously as the encryption key identifying information is read from the storage section 12. A second comparison challenge code is generated by placing the second constant C2N after the generated second code-related information. The amount of data of communications (transmission and reception) of a second challenge code can be reduced by, as described above, determining part of the second challenge code randomly and making the remaining part a constant.

The main body authentication section 42 generates second comparison encrypted information by encrypting the second comparison challenge code stored in the storage section 12 using the encryption key kN that is identified by using the encryption key identifying information that was received in performing the authentication function processing.

Further, the main body authentication section 42 compares a predetermined part of the second comparison encrypted information with part of information obtained by encrypting the second challenge code in the main body 2. Where the second-half 64 bits are extracted as the predetermined part as in the above-described example, the main body authentication section 42 extracts the second-half 64 bits from the second comparison encrypted information and compares the extracted 64-bit information with the second encryption-related information (64 bits) received from the main body 2.

If they coincide with each other, the main body authentication section 42 (i.e., peripheral device 1) judges that the main body 2 is an authorized (e.g., genuine) one and reports the judgment result to the main body 2. If the main body authentication section 42 judges that the predetermined part of the second comparison encrypted information does not coincide with the second encryption-related information received from the main body 2, that is, the main body 2 is not an authorized one, the main body authentication section 42 reports the judgment result to the main body 2.

Next, the operation of the control section 21 of the main body 2 which operates as the authentication requesting device will be described. An encryption key kN is stored in the storage section 22 of the main body 2 in advance. The encryption key kN is made the same as one of the plural encryption keys stored in the storage section 12 of the peripheral device 1 as the device to be authenticated. Further, encryption key identifying information (e.g., key number N) which is information necessary for identifying the encryption key in the peripheral device 1 is stored in the storage section 22 in advance.

Figure 5:
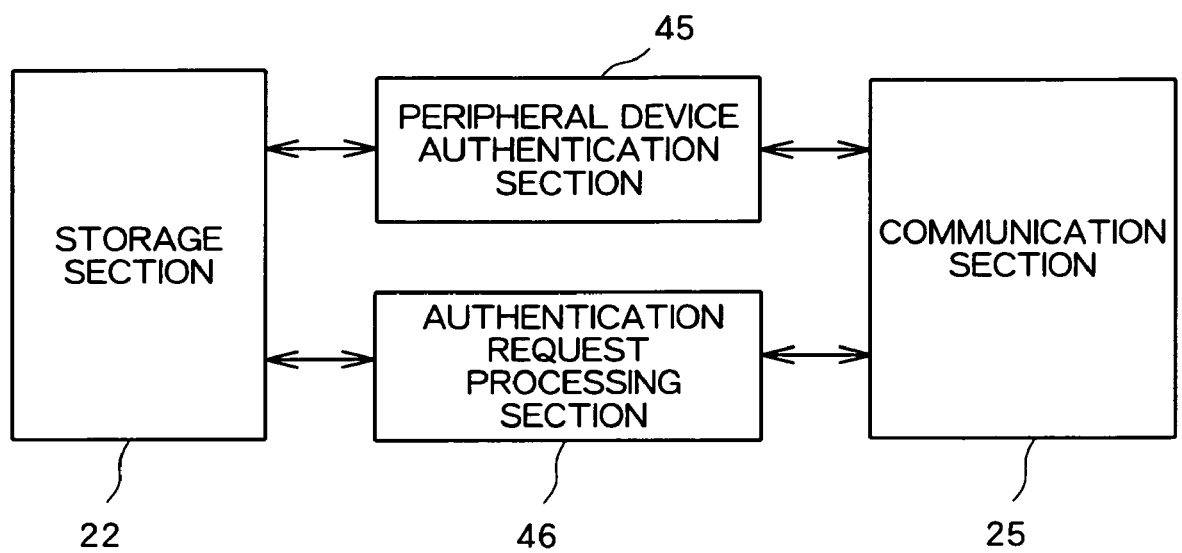
FIG. 5 is a functional block diagram of an example of the main body 2.

The control section 21 of the main body 2 realizes functions shown in FIG. 5. Expressed in functional terms, as shown in FIG. 5, the control section 21 includes a peripheral device authentication section 45 and an authentication request processing section 46. The peripheral device authentication section 45 generates first code-related information from which a first comparison challenge code is to be generated. For example, the peripheral device authentication section 45 generates a random number by a random number routine, and transmits the generated random number as first code-related information to the peripheral device 1 via the communication section 25. The peripheral device authentication section 45 also transmits the encryption key identifying information (e.g., key number N) to be used for identifying the encryption key kN.

Further, the peripheral device authentication section 45 generates a first comparison challenge code on the basis of the generated first code-related information. In this embodiment, a first constant C1i to be used in the peripheral device 1 is stored in the storage section 22 in advance. In this example, since the first constant C1N which is identified by using the encryption key identifying information (key number N) is used in the peripheral device 1, the first constant C1N is stored in the storage section 22.

The peripheral device authentication section 45 generates a first comparison challenge code by placing the first constant C1N stored in the storage section 22 after the generated code-related information. The amount of data of communications (transmission and reception) of a challenge code can be reduced by, as described above, determining part of the challenge code randomly and making the remaining part a constant.

The peripheral device authentication section 45 generates first comparison encrypted information by encrypting the generated first comparison challenge code by the encryption key kN stored in the storage section 22.

Further, the peripheral device authentication section 45 receives, from the peripheral device 1, as first encryption-related information, part of a result of encryption of a first challenge code performed in the peripheral device 1 by using the encryption key kN. And the peripheral device authentication section 45 compares a predetermined part of the first comparison encrypted information with the first encryption-related information received from the peripheral device 1. Where the second-half 64 bits are extracted as the predetermined part as in the above-described example, the peripheral device authentication section 45 extracts the second-half 64 bits from the first comparison encrypted information and compares the extracted 64-bit information with the first encryption-related information (64 bits) received from the peripheral device 1.

If they coincide with each other, the peripheral device authentication section 45 judges that the peripheral device 1 is an authorized (e.g., genuine) one.

Furthermore, the main body 2 holds, in advance, the second constant C2N which is used in the peripheral device 1. The authentication request processing section 46 generates a second challenge code by placing the second constant C2N after second code-related information that is received from the main body authentication section 42 of the peripheral device 1.

The authentication request processing section 46 generates second encrypted information by reading the encryption code kN from the storage section 22 and encrypting the generated second challenge code using the encryption code kN. Further, the authentication request processing section 46 extracts, as second encryption-related information, a predetermined part (e.g., second half) of the second encrypted information and transmits the extracted second encryption-related information to the peripheral device 1.

Although the above description is directed to the case that both of the processing of authenticating the peripheral device 1 and the processing of authenticating the main body 2 by peripheral device 1 are performed, only the processing that the main body 2 authenticates the peripheral device 1 may be performed if it is sufficient. In this case, the main body authentication section 42 of the peripheral device 1 and the authentication requesting section 46 of the main body 2 are not always necessary.

One important feature of this embodiment is that whether authentication has succeeded or failed is reported by using data that includes a predetermined part of the second comparison encrypted information. In this embodiment, a report to the effect that the main body 2 has been authenticated is made by transmitting a prescribed part itself of the second comparison encrypted information to the main body 2 as authentication success data. A report to the effect that the main body 2 has not been authenticated is made by transmitting, to the main body 2, as authentication failure data, data obtained by negating the individual bits of the prescribed part of the second comparison encrypted information. The negation means an operation of changing bit "1" to "0" and bit "0" to "1." A logical operation of leaving every bit of data as it is corresponds to a "second logical operation" of the invention, and a logical operation of negating every bit of data corresponds to a "first logical operation" of the invention. Correspondingly, when the main body 2 reports when the peripheral device 1 has been authenticated, the main body 2 transmits a prescribed part itself of the first comparison encrypted information. A report to the effect that the peripheral device 1 has not been authenticated is made by transmitting, to the peripheral device 1, as authentication failure data, data obtained by negating the individual bits of the prescribed part of the first comparison encrypted information.

The main body 2 compares the received authentication success data with the second encryption-related information that it transmitted before. If coincidence is found, the main body 2 judges that it has been authenticated.

The authentication success data and the authentication failure data may be a predetermined constant such as data all bits of which are "1" or "0." However, where a constant is used for this purpose, for example, information to the effect that the main body 2 has been authenticated can be sent by transmitting the constant as authentication success data using an illegally manufactured MOD chip. To avoid such weakness in security, in this embodiment, authentication success data or authentication failure data is generated by using, instead of a constant, the predetermined part of comparison encrypted information which takes a different value every time authentication processing is performed.

In this embodiment, first and/or second challenge code(s) and first and/or second encrypted information obtained by encrypting the first and/or second challenge code(s) are not transmitted and received in their entireties and, instead, parts of those are transmitted and received. This makes it possible to reduce the amount of data that are exchanged for authentication processing and thereby contributes to reduction of the communication load.

Next, the operations of the peripheral device 1 and the main body 2 as the device to be authenticated and the authentication requesting device, respectively, will be described with reference to FIG. 6. FIG. 6 is a flowchart showing a flow of communications between the peripheral device 1 and the main body 2. At the beginning, an encryption key k0, a first constant C10, and a second constant C20 which correspond to encryption key identifying information N=0 are stored in the storage section 22 of the main body 2.

When the peripheral device 1 is connected to the main body 2, the main body 2 generates a 64-bit random number R1 in step S1 and transmits the encryption key identifying information (in this example, the key number "0") to be used for identifying the encryption key k0 and the random number R1 to serve as first code-related information to the peripheral device 1 in step S2.

At step S3, the main body 2 generates a first comparison challenge code by placing the first constant C10 after the random number R1 which is the first code-related information generated in step S1. In the following description, placing two pieces of information adjacent to each other will be denoted by symbol "∥." Therefore, the first comparison challenge code is represented by "R1∥C10."

At step S4, the main body 2 generates first comparison encrypted information by encrypting the generated first comparison challenge code R1∥C10 using the encryption key k0. A rule is now set that information obtained by encrypting subject data d using an encryption key k should be represented by ENC(k, d). The generated first comparison encrypted information is represented by ENC(k0, (R1∥C10)).

The peripheral device 1 receives the first code-related information R1 and the key number "0" (encryption key identifying information) from the main body 2, and reads an encryption key k0 and a first constant C10 that are identified by the encryption key identifying information "0" from the storage section 12. At step S5, the peripheral device 1 generates a first challenge code R1∥C10 by placing the first code-related information R1 and the first constant C10 adjacent to each other.

At step S6, the peripheral device 1 generates first encrypted information ENC(k0, (R1∥C10)) by encrypting the generated first challenge code R1∥C10 using the encryption key k0 and extracts a prescribed part (e.g., lower 64 bits) of the generated first encrypted information ENC(k0, (R1∥C10)) to produce first encryption-related information. At step S7, the peripheral device 1 transmits the extracted first encryption-related information to the main body 2.

The main body 2 receives the first encryption-related information. At step S8, the main body 2 checks whether the prescribed part (lower 64 bits) of the first comparison encrypted information generated in step S4 coincides with the received first encryption-related information and thereby authenticates the peripheral device 1.

In general, a party who intends to manufacture a peripheral device illegally does not know the encryption key k0 or the first constant C10 and hence cannot generate the first challenge code or the first encrypted information. Therefore, in this case, in general, in step S8 the prescribed part (lower 64 bits) of the first encrypted comparison information does not coincide with the received first encryption-related information. The peripheral device 1 can thus be judged an illegal one.

The peripheral device 1 may generate, in step S9, second code-related information that relates to a challenge code (second challenge code) to be used for authenticating the main body 2. In this embodiment, the peripheral device 1 generates a 64-bit random number R2 by a random number routine in step S9, and transmits the generated random number R2 as second code-related information to the main body 2 together with the first encryption-relates information in step S7.

The peripheral device 1 generates a second comparison challenge code on the basis of the second code-related information R2. In this case, the peripheral device 1 reads, from the storage section 12, a second constant C20 corresponding to the key number "0" as the encryption key identifying information that was received in step S2. At step S10, the peripheral device 1 generates a second comparison challenge code R2∥C20 by placing the second constant S20 after the second code-related information R2.

At step S11, the peripheral device 1 generates second comparison encrypted information ENC(k0, (R2∥C20)) by encrypting the second comparison challenge code R2∥C20 using the encryption key k0 that is identified by using the key number "0" as the encryption key identifying information.

At step S12, the main body 2 generates a second challenge code R2∥C20 by placing the second constant C20 after the second code-related information R2 that was received in step S7 and acquires the second challenge code R2∥C20. At step S13, the main body 2 generates second encrypted information ENC(k0, (R2∥C20)) by encrypting the generated second challenge code R2∥C20 using the encryption key k0, and extracts a prescribed part (lower 64 bits) of the second encrypted information ENC(k0, (R2∥C20)) to produce second encryption-related information. At step S14, the main body 2 transmits the extracted second encryption-related information to the peripheral device 1.

Receiving the second encryption-related information from the main body 2, in step S15 the peripheral device 1 judges whether the prescribed part (lower 64 bits) of the second comparison encrypted information that was generated in step S11 coincides with the second encryption-related information received from the main body 2. At step S16, the peripheral device 1 transmits a result of the judgment to the main body 2.

As described above, if the prescribed part (lower 64 bits) of the second comparison encrypted information that was generated in step S11 coincides with the second encryption-related information received from the main body 2, the peripheral device 1 transmits the prescribed part itself of the second comparison encrypted information that was generated in step S11 to the main body 2 as authentication success data.

If the prescribed part (lower 64 bits) of the second comparison encrypted information that was generated in step S11 does not coincide with the second encryption-related information received from the main body 2, the peripheral device 1 generates authentication failure data by negating every bit of the prescribed part of the second comparison encrypted information that was generated in step S11 and transmits the generated authentication failure data to the main body 2.

At step S17, the main body 2 judges whether the main body 2 itself has been successfully authenticated on the basis of the judgment result that was received in step S16. In this embodiment, the main body 2 compares the prescribed part of the second encrypted information that was transmitted in step S13 with the information of the judgment result that was received in step S16. If they coincide with each other, the main body 2 judges that itself has been successfully authenticated. If the encryption key k0, for example, has leaked, the main body 2 is retrieved and the encryption key etc. stored in the storage section 22 are replaced (overwritten) by, for example, an encryption key k1, a first constant C11, and a second constant C21 (each of which is stored in the peripheral device 1 in advance) that are identified by using a key number "1." The encryption key identifying information is then changed to "1." This makes it possible to update the encryption key etc. without the need for collecting peripheral devices 1 (much more peripheral devices 1 are on the market than main bodies 2).

While the main body 2 and the peripheral device 1 are connected to each other, the communications shown in FIG. 6 may be performed repeatedly, that is, every time a prescribed timing arrives. If the peripheral device 1 is not authenticated in step S8, the main body 2 may return to step S1 and perform the process of FIG. 6 again. Likewise, if it is found in step S17 that the main body 2 itself has not been authenticated, the main body 2 may return to step S1 and perform the process of FIG. 6 again.

Although the above description is such that parts of both of a first or second challenge code and first or second encrypted information which are used for authentication processing are transmitted, one of those may be transmitted in its entirety. Where one of those may be transmitted in its entirety, the communication load increases accordingly but the security level can be increased by making a coincidence/non-coincidence judgment by transmitting the entire first or second encrypted information, for example.

Where part of a first or second challenge code is transmitted as first or second code-related information, the order of the connection of the first or second code-related information and the constant C is not limited to the above-described one "R1∥C" and may be "C∥R." Further, their connection order in the process for authenticating the peripheral device 1 by the main body 2 (steps S1-S8 in FIG. 6) and that in the process for authenticating the main body 2 by the peripheral device 1 (steps S9-S17 in FIG. 6) may be different from each other.

The control section 21 stores a flag indicating an authentication result in the storage section 22. For example, the flag is set to "0" when authentication processing has succeeded and to "1" when authentication processing has failed.

In this embodiment, each of the control section 21 of the main body 2 and the control section 11 of the battery as the peripheral device 1 performs authentication processing again if authentication processing just performed has resulted in a failure. Even if authentication processing has succeeded, each of the control sections 21 and 11 may perform authentication processing again after a lapse of a prescribed time.

Another important feature of this embodiment is that the authentication process performed by the control section 21 depends on whether the power control section 27 is supplied with power from an external power source. For example, when the power is turned on, the control section 21 checks whether or not the battery as the peripheral device 1 is connected to the power control section 27. If the battery is connected to the power control section 27, the control section 21 starts a process shown in FIG. 7. Although the following description will be made with an assumption that a storage area to serve as a failure counter for holding the number of times of consecutive authentication failures is secured in the storage section 22, a failure counter may be provided in a register of the CPU that operates as the control section 21.

At step S21, the control section 21 performs battery authentication processing. In step S22, the control section 21 checks whether or not the battery authentication processing has succeeded (i.e., whether the battery has been judged to be authentic). That is, the control section 21 checks whether or not the authentication-related flag is set to "1" (i.e., the value indicating that the authentication processing just performed has resulted in a failure). If it is judged that the authentication processing has failed, in step S23 the failure counter is incremented by one. At step S24, the control section 21 judges whether or not the power control section 27 is supplied with power from an external power source.

If the power control section 27 is not supplied with power from an external power source, in step S25 the control section 21 sets the authentication processing repetition interval at a first prescribed interval value (e.g., 100 ms) and sets the threshold value of the number of times of authentication failures at a first threshold value (e.g., 30). In step S26, the control section 21 checks whether or not the value of the failure counter has exceeded the threshold value. If the value of the failure counter has exceeded the threshold value, in step S27 the control section 21 executes a failure-time process and the process ends. That is, the control section 21 executes the failure-time process if authentication processing has failed consecutively more than the number of times that is equal to the set threshold value and then turns off the power of the main body 2.

On the other hand, if it is judged in step S26 that the number of times of failures has not exceeded the set threshold value, in step S28 the control section 21 suspends the process for a time that is equal to the authentication processing repetition interval. After a lapse of that time, the process is returned to step S21 and restarted.

If it is judged in step S24 that the power control section 27 is supplied with power from an external power source, in step S29 the control section 21 sets the authentication processing repetition interval at a second prescribed interval value (e.g., 500 ms) and sets the threshold value of the number of times of authentication failures at a second threshold value (e.g., 600). Then, the process moves to step S26 and continues to be executed.

As described above, the prescribed repetition interval value and the threshold value of the number of times of failures are changed and the period during which the authentication processing is repeated is thereby changed depending on whether or not the power control section 27 is supplied with power from an external power source. This measure takes into consideration cases where, for example, the control section 11 cannot operate if the secondary battery of the functional section 14 has almost no residual energy even though the battery is authentic. If the control section 11 is not in operation, even if the main body 2 (authentication requesting device) transmits a random number to the battery, the battery cannot transmit encryption-related information and hence the main body 2 judges that the battery has not been authenticated. In view of this, in this embodiment, while the power control section 27 is being supplied with power from an external power source and the battery is being charged, the authentication processing interval is set longer and the number of times of repetitions of authentication processing is set larger. As a result, if the battery is empty at the beginning, the authentication processing repetition period is drawn out so that the battery will be charged to such an extent as to render the control section 11 operational.

Further, if it is judged in step S22 that the battery has been successfully authenticated, in step S30 the control section 21 resets the failure counter to "0." Then, the control section 21 sets the authentication processing repetition interval at a third prescribed interval value (e.g., 30 s) in step S31 and executes a success-time process in step S32. The process moves to step S28 and continues to be executed.

For example, the failure-time process (step S27) may be a process of instructing the power control section 27 to shut off the power to thereby turn off the main body 2 or a process of causing the display control section 24 to make such a display as "Unusable" and stopping game-related processing.

For example, the success-time process (step S32) may be a process of starting game-related processing. If game-related processing has already been started, it is not always necessary that any actual processing be performed in the success-time process.

The storage area as the failure counter may be secured in a nonvolatile memory of the storage section 22 so that its content is held even after a power shutoff. This prevents an act of continuing to play a game intermittently by resetting the failure counter halfway by, for example, connecting and disconnecting an external power source to the main body 2 or regularly suspending a game and turning on the power again.

As described above, the embodiment provides a process in which consideration is given to problems specific to authentication of a battery, such as a problem that authentication of a battery as a main unit for supplying power is disabled because the battery has not been charged sufficiently yet.

Although the above description is directed to the case that the main body 2 is a home game machine, the invention is not limited to such a case. For example, it is possible that the peripheral device 1 is a battery and the main body 2 is its charger. In this case, the main body 2 need not always be equipped with the manipulation section 23 and the display control section 24. And the failure-time process and the success-time process which are executed by the control section 21 may be, for example, suspension of charging and a start of charging, respectively.

While the present invention is described in terms of preferred or exemplary embodiments, it is not limited hereto.

What is claimed is:

1. A battery to be connected to an authentication requesting device, for transmitting information related to authentication in response to an authentication request from the authentication requesting device, comprising:

a storage section storing a plurality of encryption keys, a plurality of first constants, and a plurality of second constants, the first constants and the second constants having a predetermined number of bits;

means for receiving first code-related information, which is a part of a first challenge code, and a key number specifying one of the plurality of encryption keys, from the authentication requesting device;

means for reading one of the plurality of first constants from the storage section based on the key number;

a first code generating means for generating the first challenge code by connecting the received first code-related information and the read first constant;

means for generating first encrypted information by reading, as an encryption key, one of the plurality of encryption keys specified by the key number from the storage section and encrypting the generated first challenge code, using the read encryption key;

means for taking out a predetermined part of the generated first encrypted information and transmitting the part to the authentication requesting device;

means for generating second code-related information for authenticating the authentication requesting device and transmitting the generated second code-related information to the authentication requesting device;

means for reading one of the plurality of second constants from the storage section based on the key number;
a second code generating means for generating a second challenge code by connecting the generated second code-related information and the read second constant;
means for generating comparison encrypted information by encrypting the generated second challenge code, using the encryption key specified by the key number;
means for receiving a part of second encrypted information which is generated by the authentication requesting device from the authentication requesting device, and making a comparison between the received part of the second encrypted information and comparison partial information which is a part extracted from the comparison encrypted information, the part corresponding to the received part of the second encrypted information; and
means for transmitting information related to a result of the comparison.

2. The battery according to claim 1, wherein the second code-related information is a random value having a predetermined number of bits.

3. A control method for a battery connected to an authentication requesting device, for transmitting information related to authentication in response to an authentication request from the authentication requesting device, in which the battery comprises a storage section storing a plurality of encryption keys, a plurality of first constants, and a plurality of second constants, the first constants and the second constants having a predetermined number of bits, and a control section, the control method causing the control section to execute a process comprising the steps of:
receiving first code-related information, which is a part of a first challenge code, and a key number specifying one of the plurality of encryption keys, from the authentication requesting device;
reading one of the plurality of first constants from the storage section based on the key number;
generating the first challenge code by connecting the received first code-related information and the read first constant;
generating first encrypted information by reading, as an encryption key, one of the plurality of encryption keys specified by the key number from the storage section and encrypting the generated first challenge code, using the read encryption key;
taking out a predetermined part of the generated first encrypted information and transmitting the part to the authentication requesting device;
generating second code-related information for authenticating the authentication requesting device and transmitting the generated second code-related information to the authentication requesting device;
reading one of the plurality of second constants from the storage section based on the key number;
generating a second challenge code by connecting the generated second code-related information and the read second constant;
generating comparison encrypted information by encrypting the generated second challenge code, using the encryption key specified by the key number;
extracting, as comparison partial information, when receiving a part of second encrypted information which is generated by the authentication requesting device from the authentication requesting device, a part corresponding to the received part of the second encrypted information from the comparison encrypted information, and making a comparison between the comparison partial information and the received part of the second encrypted information; and
transmitting, when the comparison proves that the comparison partial information is different from the received part of the second encrypted information, a value corresponding to a result of a prescribed first logical operation performed on the comparison partial information, and transmitting, when the comparison proves that the comparison partial information coincides with the received part of the second encrypted information, a value corresponding to a result of a prescribed second logical operation performed on the comparison partial information.

4. A program held in a battery connected to an authentication requesting device, for transmitting information related to authentication in response to an authentication request from the authentication requesting device, in which the battery comprises a storage section storing a plurality of encryption keys, a plurality of first constants, and a plurality of second constants, the first constants and the second constants having a predetermined number of bits, and a control section, the program causing the control section to execute a process comprising the steps of:
receiving first code-related information, which is a part of a first challenge code, and a key number specifying one of the plurality of encryption keys, from the authentication requesting device;
reading one of the plurality of first constants from the storage section based on the key number;
generating the first challenge code by connecting the received first code-related information and the read first constant;
generating first encrypted information by reading, as an encryption key, one of the plurality of encryption keys specified by the key number from the storage section and encrypting the generated first challenge code, using the read encryption key;
taking out a predetermined part of the generated first encrypted information and transmitting the part to the authentication requesting device;
generating second code-related information for authenticating the authentication requesting device and transmitting the generated second code-related information to the authentication requesting device;
reading one of the plurality of second constants from the storage section based on the key number;
generating a second challenge code by connecting the generated second code-related information and the read second constant;
generating comparison encrypted information by encrypting the generated second challenge code, using the encryption key specified by the key number;
receiving a part of encrypted information which is generated by the authentication requesting device from the authentication requesting device;
extracting, as comparison partial information, a part corresponding to the received part of the second encrypted information from the comparison encrypted information, and making a comparison between the comparison partial information and the received part of the second encrypted information; and
transmitting, when the comparison proves that the comparison partial information is different from the received part of the second encrypted information, a value corresponding to a result of a prescribed first logical operation performed on the comparison partial information, and transmitting, when the comparison proves that the comparison partial information coincides with the received part of the second encrypted information, a value corresponding to a result of a prescribed second logical operation performed on the comparison partial information.

5. A computer readable storage medium storing a program to be held in a battery connected to an authentication requesting device, for transmitting information related to authentication in response to an authentication request from the authentication requesting device, in which the battery comprises a storage section storing a plurality of encryption keys, a plurality of first constants, and a plurality of second constants, the first constants and the second constants having a predetermined number of bits, and a control section, the program causing the control section to execute a process comprising the steps of:

receiving first code-related information, which is a part of a first challenge code, and a key number specifying one of the plurality of encryption keys, from the authentication requesting device;

reading one of the plurality of first constants from the storage section based on the key number;

generating the first challenge code by connecting the received first code-related information and the read first constant;

generating first encrypted information by reading, as an encryption key, one of the plurality of encryption keys specified by the key number from the storage section and encrypting the generated first challenge code, using the read encryption key;

taking out a predetermined part of the generated first encrypted information and transmitting the part to the authentication requesting device;

generating second code-related information for authenticating the authentication requesting device and transmitting the generated second code-related information to the authentication requesting device;

reading one of the plurality of second constants from the storage section based on the key number;

generating a second challenge code by connecting the generated second code-related information and the read second constant;

generating comparison encrypted information by encrypting the generated second challenge code, using the encryption key specified by the key number;

extracting, as comparison partial information, when receiving a part of second encrypted information which is generated by the authentication requesting device from the authentication requesting device, a part corresponding to the received part of the second encrypted information from the comparison encrypted information, and making a comparison between the comparison partial information and the received part of the second encrypted information; and transmitting, when the comparison proves that the comparison partial information is different from the received part of the encrypted information, a value corresponding to a result of a prescribed first logical operation performed on the comparison partial information, and transmitting, when the comparison proves that the comparison partial information coincides with the received part of the second encrypted information, a value corresponding to a result of a prescribed second logical operation performed on the comparison partial information.

6. The control method according to claim 3, wherein the second code-related information is a random value having a predetermined number of bits.

7. The program according to claim 4, wherein the second code-related information is a random value having a predetermined number of bits.

8. The computer readable storage medium according to claim 5, wherein the second code-related information is a random value having a predetermined number of bits.

* * * * *

UNITED STATES PATENT AND TRADEMARK OFFICE
CERTIFICATE OF CORRECTION

PATENT NO.        : 7,617,395 B2                                                Page 1 of 1
APPLICATION NO. : 11/283675
DATED             : November 10, 2009
INVENTOR(S)       : Sasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Nineteenth Day of October, 2010

David J. Kappos
*Director of the United States Patent and Trademark Office*